United States Patent [19]

Torstensson

[11] Patent Number: 5,052,492
[45] Date of Patent: Oct. 1, 1991

[54] METHOD FOR SEALING AN ELONGATED, HOLLOW CAVITY, AND A DEVICE FOR CARRYING OUT THE METHOD

[76] Inventor: Bengt-Arne Torstensson, Höjdvägen 34, S-186 00 Vallentuna, Sweden

[21] Appl. No.: 548,977
[22] PCT Filed: Feb. 2, 1989
[86] PCT No.: PCT/SE89/00038
  § 371 Date: Aug. 3, 1990
  § 102(e) Date: Aug. 3, 1990
[87] PCT Pub. No.: WO89/07190
  PCT Pub. Date: Aug. 10, 1989

[30] Foreign Application Priority Data

Feb. 5, 1988 [SE] Sweden ................... 8800373

[51] Int. Cl.⁵ .................. E21B 33/12; F16L 55/128
[52] U.S. Cl. .................. 166/387; 166/179; 166/187; 166/191; 138/93
[58] Field of Search .......... 166/387, 179, 187, 188, 166/191, 192; 138/89, 93; 277/34, 34.6

[56] References Cited

U.S. PATENT DOCUMENTS

| 831,603 | 9/1906 | Davis | 166/187 |
| 2,130,030 | 9/1938 | Richardson | 138/93 |
| 3,662,827 | 5/1972 | Segelhorst | 166/187 |
| 3,786,864 | 1/1974 | Segelhorst | 166/187 |
| 4,302,018 | 11/1981 | Harvey et al. | 277/34 |
| 4,342,336 | 8/1982 | Satterthwaite et al. | 277/34 |
| 4,589,484 | 5/1986 | Doherty et al. | 166/179 |

FOREIGN PATENT DOCUMENTS 1260506 1/1982 U.S.S.R. .

Primary Examiner—Bruce M. Kisliuk
Attorney, Agent, or Firm—Nies, Kurz, Bergert & Tamburro

[57] ABSTRACT

A method for sealing elongated hollow cavities (2), such as circular-cylindrical pipes, tubes, drill holes or the like, in which a body (1) is placed in the cavity in sealing contact with the inner surface (4) of the cavity. The method has at least one essentially annular, elastic sealing element (3) sealingly mounted in a radially and circumferentially extending gap present in the body (1) and which is caused to be urged radially outwards into sealing abutment with the inner surface (4) of the cavity (2), by means of pressure (p) applied internally of the body. There is also a device for carrying out the mehtod.

19 Claims, 4 Drawing Sheets

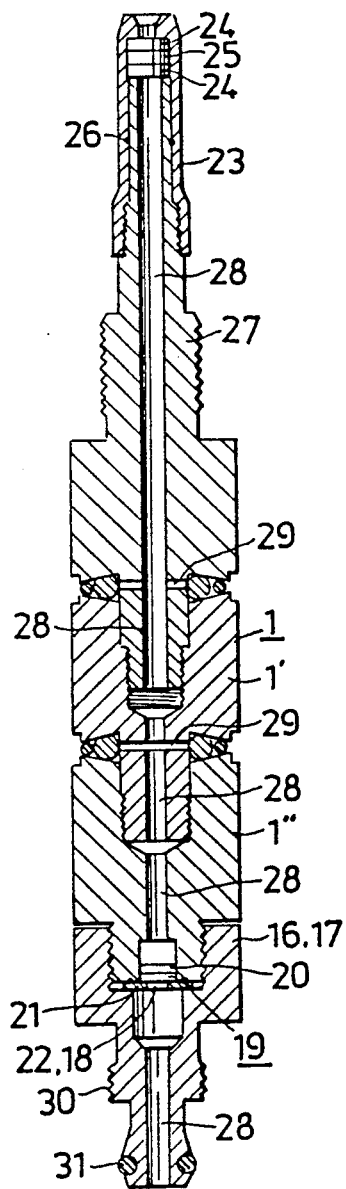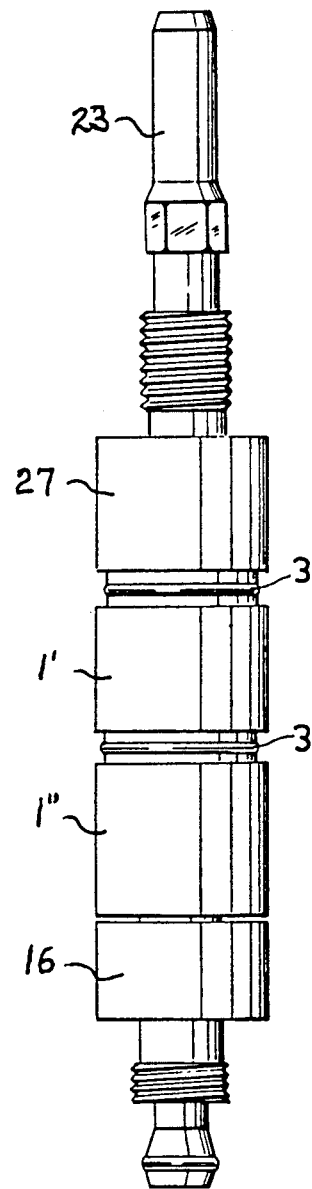

METHOD FOR SEALING AN ELONGATED, HOLLOW CAVITY, AND A DEVICE FOR CARRYING OUT THE METHOD

The present invention relates to a method for sealing-off elongated, hollow cavities, such as circular-cylindrical pipes, tubes, drill holes and the like, in which a body is placed in said cavity in sealing contact with the inner defining surface(s) thereof.

The invention also relates to a device for carrying out the method.

There is often a need within, for instance, the fields of geotechnology and geology to seal off effectively tubes or pipes which have been installed in the ground or in holes drilled in a rock. The task of sealing off such cavities is often encumbered with considerable problems, such as when the seal is to be located at considerable depths, is required to be durable over long periods of time and is intended to withstand considerable pressures, for instance.

The object of the present invention is to provide an effective and highly simple solution to this problem and one which will satisfy the aforesaid requirements.

By way of example, the invention may applied in connection with an arrangement or a system essentially of the kind disclosed in Swedish Patent Specification No 432 306.

The invention thus relates to a method for sealing elongated, hollow cavities such as circular-cylindrical pipes or tubes, drill holes and like configurations, in which a body is placed in the cavity in sealing contact with the internal defining surface(s) thereof. The method is particularly characterized in that at least one substantially annular and elastic sealing element, sealingly arranged in a gap which extends radially and circumferentially of the body, is caused to be urged radially outwards into sealing abutment with the inside surface of the cavity, by means of pressure applied from within the body.

The invention also relates to a device for sealing elongated, hollow cavities, such as circular-cylindrical tubes or pipes, drill holes or like configurations, comprising a body which is intended to be placed in the cavity in sealing contact with the inner defining surface(s) thereof. The device is particularly characterized in that a substantially annular, elastic sealing element is sealingly arranged in a gap which extends radially and circumferentially in the body, and in that channels are provided through which pressure is applied internally of the body such as to urge the sealing element radially outwards and into sealing abutment with the inner defining surface of the cavity.

The invention will now be described in more detail with reference to exemplifying embodiments thereof and to the accompanying drawings, in which FIG. 1 is a principle drawing of an inventive device intended for use in connection with a circular-cylindrical tube or pipe;

FIGS. 2a-d are axial views which illustrate part of an inventive device in various stages of a cavity sealing process;

FIG. 3b is a sectional view taken on the line A—A in FIG. 3a;

FIG. 5a is an axial sectional view of part of a second embodiment of an inventive device;

FIG. 5b is a verticle side view of the device illustrated in FIG. 5a;

Figure 1:
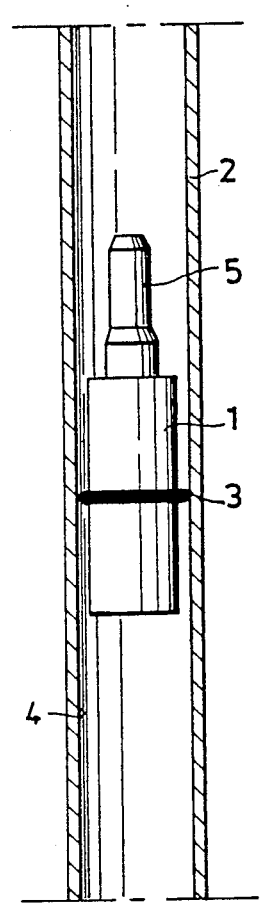
Figure 2A:
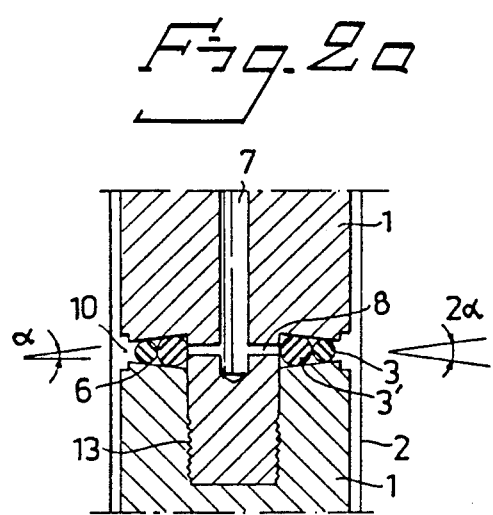
Figure 2B:
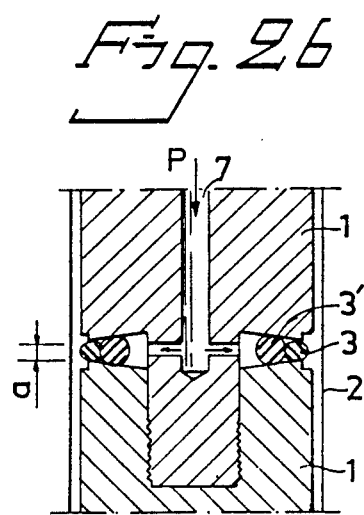
Figure 2C:
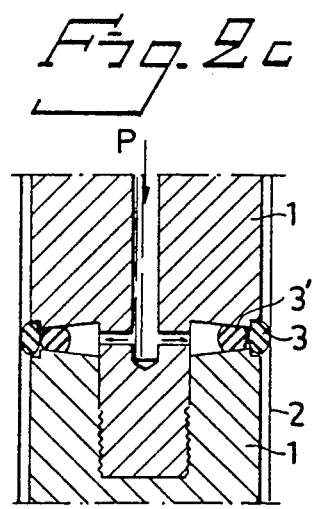
Figure 2D:
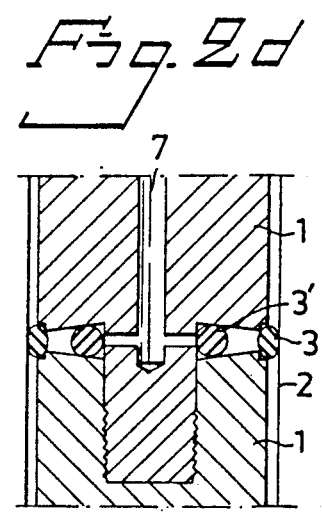

In FIG. 1 the reference 1 identifies a substantially circular-cylindrical body which is intended to seal a circular-cylindrical pipe or tube 2 with the aid of a sealing element 3, such as an O-ring, via which the body 1 is intended to lie in sealing contact with the inner surface 4 of the pipe 2. The reference 5 identifies a nipple device which enables connection to a pressure line, not shown in FIG. 2. The body 1, together with the sealing element 3, is intended to be inserted down into the pipe 2, which in the illustrated case consists of an elongated, hollow cavity 2, and be brought into sealing contact with the inner surface 4 of the cavity 2, by applying a pressure p within the body, FIG. 2b, c, so as to urge the sealing element 4 radially outwards and into sealing engagement with said inner surface 4.

In the case of the FIG. 2 embodiment, which in many instances is the embodiment preferred, the reference 3, as before, identifies a sealing element, which in this case is a radially outer sealing element, and reference 3' identifies a radially inner sealing element, the two elements 3, 3' being essentially concentrical with one another. The elements 3, 3' are arranged sealingly in a gap 6 located in the body 1 and extending radially and circumferentially therewithin. The gap 6 communicates with channels or passageways which are intended for the application of said pressure p and which in the case of this embodiment comprise a centrally located axially extending channel 7 and a radial channel 8 which connects the axial channel 7 with the gap 6.

The reference 10 indentifies a slot which is located radially outwards of the gap 6 and which is connected to the gap through an opening a which is narrower axially than the cross-sectional diameter, or thickness, of the outer sealing element 3 in its non-compressed state, so as to prevent said outer sealing element from re-entering the gap subsequent to having been pressed completely, or substantially completely, through said opening a, thereby to form herewith a permanent seal, in those instances when such a seal is desried.

The gap 6 will preferably narrow outwardly. This narrowing of the gap 6 has been signified with the angles $\alpha$ and $2\alpha$ in FIG. 2. In this case, the cross-sectional diameter of the inner sealing element 3' may optionally be given a larger cross-sectional than the outer element, in the non-compressed state of said elements.

Figure 3A:
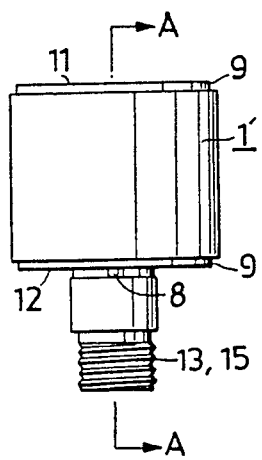
FIG. 3a illustrates a structural element according to the invention from which an inventive device is obtained.
Figure 3B:
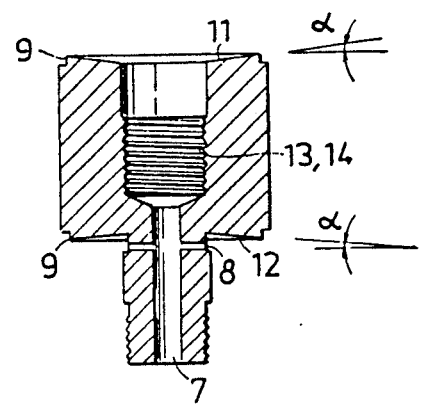

FIG. 3 illustrates a body element 1' which is intended to coact with an identical or a similar body element to produce a body 1. For the purpose of providing the gap 6 and preferably said channels, there are used two body elements, each of which has a substantially concave end surface 11, 12 and which are joined together, e.g. by means of a screw connection 13, FIG. 2 for instance, such that the end surfaces 11, 12 will face towards one another and therewith form an outwardly narrowing gap 6. In the case of the illustrated embodiment, the slot 10 located adjacent the gap 6 is formed by means of a peripheral lip or flange which extends circumferentially around each of said concave end surfaces 11, 12.

Figure 4:
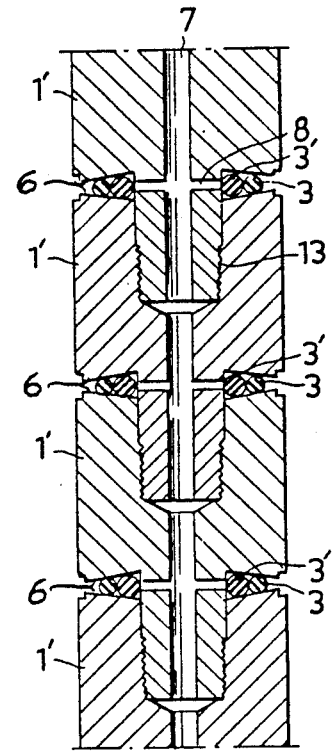
FIG. 4 is an axial sectional view of part of a first embodiment of a device constructed in accordance with the invention and based on the structural element of FIGS. 3 (3a and 3b)

The body element 1' illustrated in FIG. 3 is an example of an element 1' of standard design, where each element 1' of this kind has on one concave end surface 11 thereof a central, preferably screw-threaded recess 14 and on its other concave end surface 12 a central, preferably externally screw-threaded stud 15 corresponded to said recess, so that the two elements 1' can be screwed together, thereby enabling a selected number of body elements to be joined sequentially and to build in pairs a number of gaps 6 in the manner illustrated in FIG. 4.

FIG. 5a illustrated schematically on embodiment which includes a bottom piece 16 which is intended for connection to a modified element 1'' of the body 1 and therewith form a bottom closure 17, so as to enable pressure to be built up internally of the body and maintained therein. In the case of the illustrated embodiment, the bottom closure 17 is constructed so that it can be opened by means of said pressure applied internally of the body, to establish a connection 18 between the interior of said body 1 and said enlongated hollow tube or cavity 2 (such as seen in FIG. 1) and the elements 1'' includes a closure device assembly 19 which in order to open requires the application of a much higher internal pressure p than that required to establish a seal between the body 1 and said cavity, this seal being established by urging the sealing element radially outward into sealing abutment with the inner defining surface of the cavity. According to a preferred embodiment, the closure device assembly 19 include an internally mounted, elastic disc 20 which is supported around its rim by means of a support 21 which incorporates a central hole 22 through which the disc can be pressed out, by applying pressure internally of the body 1.

In the case of the FIG. 5 embodiment, the body 1, comprising body elements 1' and 1'', and end pieces 16 and 27, is used as a probe for taking samples of groundwater or the like for example. The reference 23 identifies a screw bushing which incorporates two radially pretensioned septa, i.e. rubber plates or washers 24, and an intermediate distance plate 25. The bushing is attached sealingly, by means of a seal 26, to a top piece 27 which incorporates an axial channel 28 and a radial channel 29 and which is connected to a first body element 1' by means of a screw connection of the aforedescribed kind.

Figure 6:
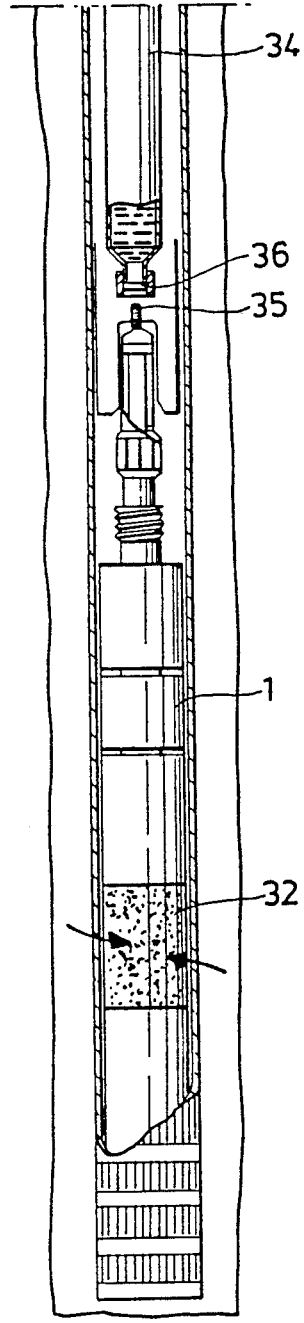
FIG. 6 illustrates schematically the use of a third embodiment of an inventive device.
Figure 7:
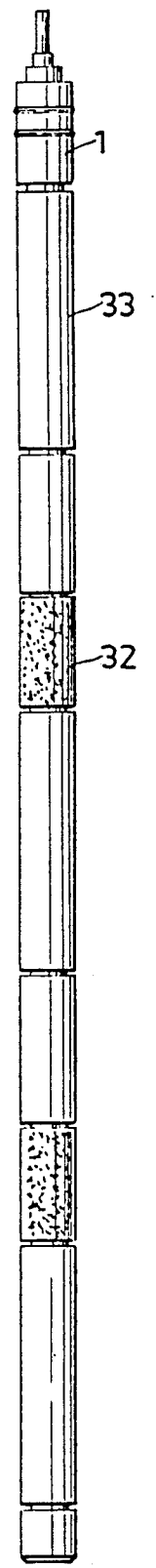
FIG. 7 illustrates a fourth embodiment of an inventive device.

The two body elements 1' and 1'' are screwed together and include an axial channel 28 and a radial channel 29 and are joined to the bottom piece 16 by a screw joint. The bottom piece, in addition to the closure device assembly 19, also includes an axial channel 28 and an external screw-thread 30 and an O-ring 31, which allow a filter device 32 or extension 33 to be fitted to the body, as shown in FIGS. 6 and 7. In the closure assembly 19, the disc 20 comprises a radially stretched or tensioned septum and the support 21 comprises a washer or round plate 21.

One aspect of use is illustrated in FIG. 6, in which the reference 34 identifies an evacuated sampling tube and the reference 35 identifies a double needle or cannula which is intended to pierce the two septa 24 in the screwbushing 23 and a corresponding septum closure 36 on the end of the sampling tube 34.

FIG. 7 illustrates an arrangement which includes two filter elements 32 and a plurality of extension elements 33.

The inventive method and the *modus operandi* of the inventive device will be understood in all essentials from the aforegoing. The body 1, optionally complemented in accordance with FIGS. 5, 6 or 7, is inserted, normally lowered, into a cavity 2, such as a pipe, tube or drill hole. Pressure is applied in the interior of the body, via a pressure line connected to the nipple 5, the screw bushing 23 or the like. As the pressure increases progressively, the device undergoes the stages illustrated in FIG. 2, in which the O-rings 3, 3' are displaced radially outwards until the outer ring has been pressed out in the slot 10. When the pressure is removed, the inner sealing element 3' will spring back, essentially to its original starting position in the gap 6, whereas the outer sealing element 3 will remain in the slot 10 and therewith retain the function of a permanent seal between the body 1, and the interior of the cavity 2, i.e. the pipe, tube, drill hole or the like.

As will be perceived from the above, the invention provides a highly purposeful solution to the problem of sealing a cavity of the kind in question.

The invention has been described in the aforegoing with reference to exemplifying embodiments thereof. It will be understood, however, that other embodiments and minor changes are conceivable within the scope of the inventive concept.

For instance, any desired number of sealing elements, such as O-rings, can be used in each gap. It has been found, however, that two elements will normally suffice. Furthermore, the number of gaps 6 in each body can be varied in comparison with, for instance, the two gaps illustrated in FIG. 2, so that a seal is obtained at a desired number of levels in each body. Naturally, more than one body can also be used in one and the same cavity.

In addition to those embodiments in which a sealing element is pressed into a slot 10 and prevented from returning into the gap, embodiments are also conceivable in which a sealing element is held in permanent sealing contact with the inner defining surface of the cavity 2, at least at times or intermittently, by means of a continuously applied internal pressure.

Neither need the elongated, hollow cavities or the body have a circular cross-section, since the invention can be applied effectively with other cross-sectional shapes. For example, a square-section tube can be used and sealed in accordance with the invention.

The present invention is thus not restricted to the aforesaid embodiments, but can be modified within the scope of the following claims.

I claim:

1. A method for sealing elongated hollow cavities, such as circular-cylindrical pipes, tubes and drill holes comprising the steps of: placing a body in the cavity in sealing contact with the inner surface of the cavity, with at least one essentially annular, elastic sealing element (3), sealingly mounted in a radially and circumferentially extending gap (6) present in the body (1); urging said sealing element radially outwards into sealing abutment with the inner surface (4) of the cavity (2), by means of applying pressure (p), internally of the body, characterized by urging two mutually concentric essentially annular elastic sealing elements (3, 3') radially outwards, and thereby bringing the radially outermost one (3) of said elements into said sealing abutment with the inner surface (4) of the cavity (2) and effecting a permanent seal between said body (1), said outermost sealing element and said sealing abutment by urging said outermost sealing element (3) essentially completely through said gap into a slot (10), extending peripherally and externally of the gap (6), while compressing the outermost sealing element (3) axially, the opening (a), between the gap (6) and the slot (10), through which the sealing element (3) is urged being smaller than the cross-sectional diameter, thickness, of said outermost sealing element (3) in its non-compressed state, and thereby preventing the outermost sealing element once disposed in said slot from reentering the gap (6).

2. A method according to claim 1, further comprising forming said gap (6) by means of two body elements (1'), each of which have a substantially concave end surface (11, 12) and which are joined together with said end surfaces facing one another, in axially spaced apart relationship thereby resulting in an outwardly narrowing gap (6).

3. A method according to claim 1, wherein said pressure is applied internally of the body (1) via at least one axial flow passage (7, 28) and at least one radial flow passage (8, 29) connecting said axial flow passage and said gap (6).

4. A method according to claim 1, wherein a bottom fluid flow connection (18) provided from said body (1) to said cavity (2) is opened by means of an internally applied pressure subsequent to urging said outermost sealing element (3) radially outward into sealing abutment with the inner surface (4) of said cavity, a considerably higher pressure being required to open said bottom fluid flow connection than that required to establish said second sealing abutment.

5. A method according to claim 4, said bottom fluid flow connection is rendered opened by pressing an internally mounted and peripherally supported elastic disc (20) from said body (1) out through a central hole (22) in the peripheral support (21) for said disc.

6. A method according to claim 1, including the further step of holding said outermost sealing element (3) in said permanent sealing abutment with the inner surface (4) of the cavity (2) by continuously maintaining an internal pressure in said body flow passages.

7. A device for sealing-off elongated hollow cavities, such as circular-cylindrical tubes, pipes and drill holes, including a body which is intended to be brought into sealing relationship with the inner surface of the cavity, at least two substantially annular, mutually concentric elastic sealing elements (3) and (3') being arranged sealingly in a gap (6), which extends radially and circumferentially in the body (1), flow passages (7, 8, 28, 29) in said body provided to enable applying in the interior of said body and to said gap a pressure which will be effective in urging the radially outermost one of said sealing elements (3) and (3') radially outwards into sealing abutment with the inner surface (4) of the cavity (2), said at least two mutually concentric, substantially annular elastic sealing elements (3, 3') being mounted in the gap (6), the body 1 having located externally thereof a slot (10), which is radially disposed relative to said gap and is connected to the gap (6) through an opening (11), which has a smaller cross-dimensional thickness than the diameter of the outermost sealing element (3) in the non-compressed state of said outermost sealing element, the outermost sealing element thereby being prevented from passing back through said opening (a) into said gap subsequent to having been pressed essentially completely through said opening (a) and therewith providing a permanent seal between said body and the surface of said cavity.

8. A device according to claim 7, characterized in that said sealing elements (3, 3') comprise O-rings.

9. A device according to claim 7, characterized in that said gap (6) narrows outwardly, and wherein the sealing element (3') of said at least two sealing elements located radially inwards of the outermost sealing element (3) has a greater thickness than the outermost sealing element in the non-compressed state of the outermost sealing element.

10. A device according to claim 7, characterized in that the device includes as said flow passages, at least one axial, longitudinal, channel (7, 28) and at least one radial channel (8, 29) connecting the longitudinal channel with said gap (6), through which said gap is placed under pressure.

11. A device according to claim 7, characterized in that said gap (6) and preferably also said channels (7, 8, 28, 29) are configured by means of two body elements (1') each of which has a substantially concave end surface (11, 12) and which are joined together by means of a connection joint (13), with said end surfaces facing towards one another to form said gap (6).

12. A device according to claim 11, characterized in that the slot (10) located radially outwards of the gap (6) is configured by a peripheral lip (9) which extends circumferentially around each of said concave end surfaces (11, 12).

13. A device according to claim 11, characterized in that said body elements (1') are essentially identical in construction, and in that each body element (1') has provided on one end surface (11) thereof a central, internally screw-threaded recess (14) and on its other end surface (12) a central, externally screw-threaded stud (15) corresponding to said recess, such as to enable said two elements to be joined together, thereby to enable a selected number of body elements to be joined together sequentially and pairwise to form a said gap therebetween.

14. A device as defined in claim 11, wherein said connection joint is a screw threaded joint.

15. A device as defined in claim 11, wherein said gap is a radially outwardly narrowing gap.

16. A device according to claim 7, characterized in that said body has attached thereto a bottom piece (16) which forms a bottom closure to said flow passages and enables pressure to be built up and sustained in the body (1).

17. A device according to claim 16, characterized in that the bottom closure is constructed so that it can be opened by means of pressure applied internally of the body, such as to establish communication (18) between the interior of said body and said cavity (2), and includes closure members (19) which in order to be opened require the application of a considerably higher internal pressure than that required to establish a seal between the radially outermost body (1) and said cavity (2) by urging the sealing element (3) into sealing abutment with the inner surface (4) of the cavity (2).

18. A device according to claim 17, characterized in that the closure members include an internally mounted elastic disc (20) which is supported peripherally by a support (21) in said body incorporating a central hole (22) through which the disc (20) can be pressed by applying pressure to the body interior.

19. A device according to claim 7, characterized in that said radially outermost sealing element (3) can be held permanently in sealing abutment with the inner surface (4) of the cavity (2) by means of a continuously sustained internal pressure in said body.

* * * * *